June 16, 1959  J. W. HENDRY  2,890,491
INJECTION MOLDING PROCESS FOR UNPLASTICIZED POLYVINYL CHLORIDE
Filed Aug. 26, 1954  3 Sheets-Sheet 1

INVENTOR.
JAMES W. HENDRY
BY
Attorney

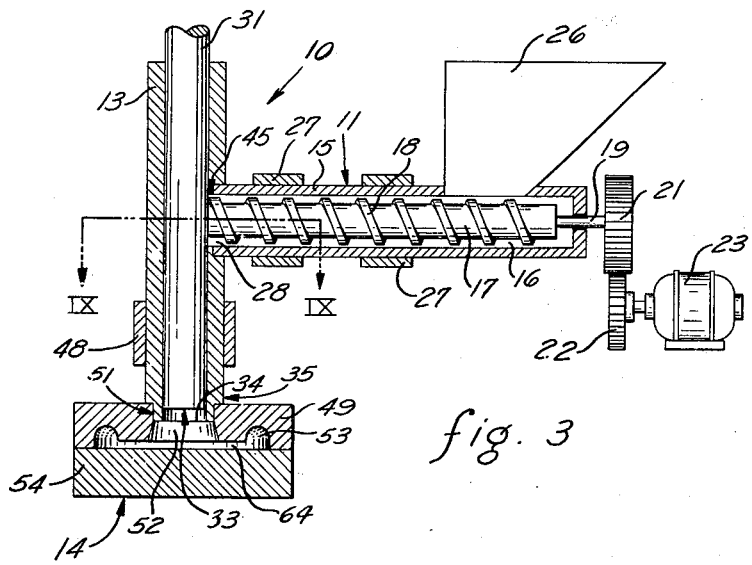

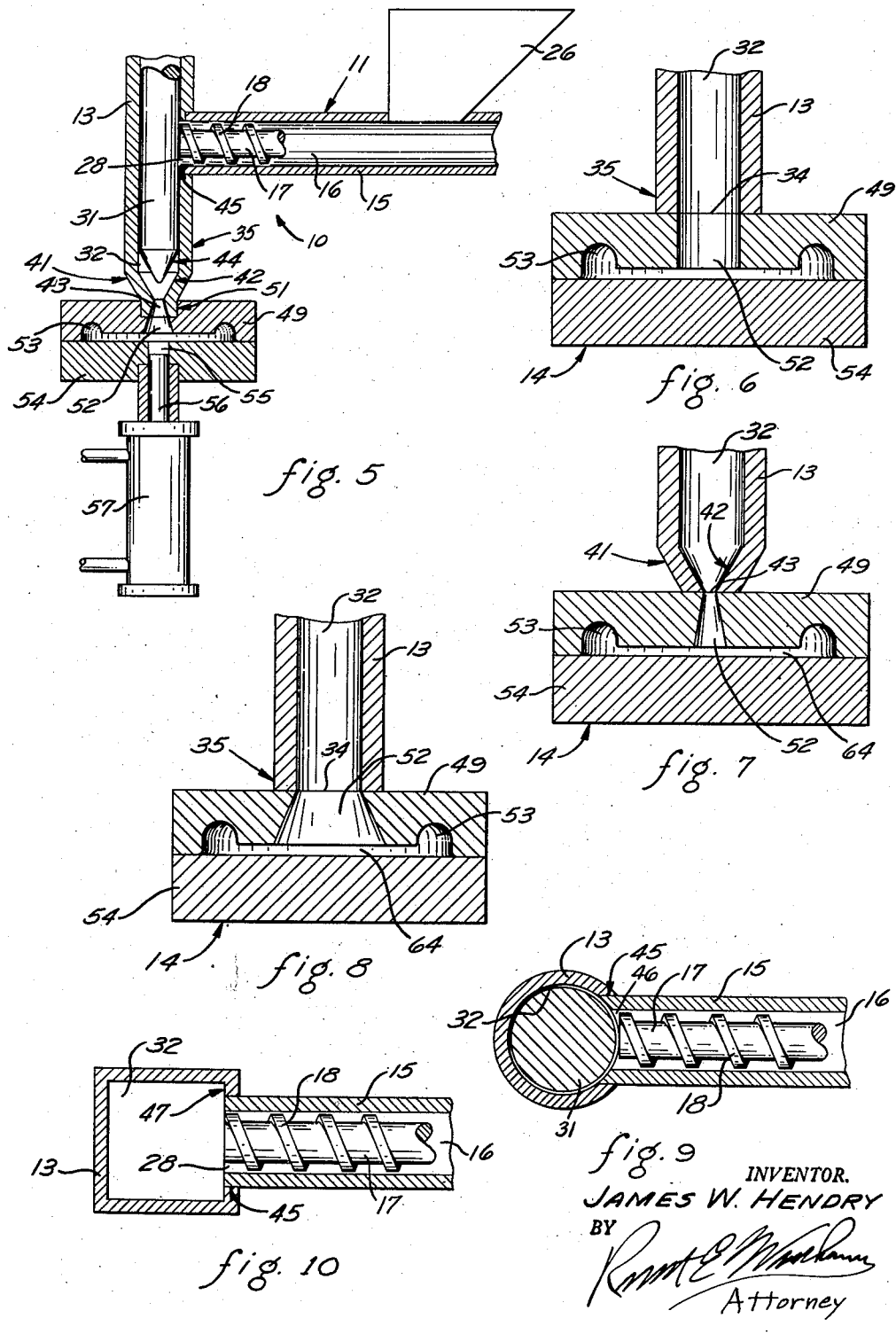

United States Patent Office 2,890,491
Patented June 16, 1959

2,890,491

INJECTION MOLDING PROCESS FOR UNPLASTICIZED POLYVINYL CHLORIDE

James W. Hendry, Saginaw, Mich., assignor, by mesne assignments, to Tube Turns Plastics, Inc., a corporation of Delaware Application August 26, 1954, Serial No. 452,315

3 Claims. (Cl. 18—55)

This invention relates to a process for molding organic plastic materials having narrow working temperature ranges and having a high viscosity at all temperatures, and particularly for molding unplasticized, or substantially unplasticized, polyvinyl chloride resin.

This application is a continuation-in-part of my application Serial No. 341,880, filed February 19, 1953, now abandoned.

In previously known molding processes of the general type herein involved, it has been customary to heat and agitate the plastic material in a preplasticizing chamber by any convenient apparatus, as by a screw or a pair of cooperating rolls, moving the plasticized material into an injection chamber, sometimes through breaker plates which tend to break up particles of plastic material and further lower the viscosity thereof, and then to drive the plastic material by a ram through a nozzle into the sprue opening of a mold. While this usually works well enough for plastic materials having a wide working temperature range, where plastic materials are involved having only a narrow range between a necessary working temperature and the temperature at which the material becomes unfit for molding, this approach is totally unworkable. Thus, unplasticized, or substantially unplasticized, polyvinyl chloride has been previously considered unmoldable by any process of the injection type.

Particularly, it has been found that if the plastic material is forced through a constriction at the discharge end of the preplasticizing chamber, as through a breaker plate, the temperature may be substantially increased, but such increase in temperature will not be subject to sufficient control and it may exceed a safe working temperature. Further, the same situation may occur at the discharge nozzle of a conventional molding machine where the plastic material is further heated as an incident to being driven at an increased rate of speed through a tapered nozzle passageway or past a torpedo. This situation is materially accentuated where the material has a very high viscosity at all temperatures, as does rigid polyvinyl chloride, and if the rate of flow is reduced sufficiently to avoid this excessive heating, then the material will cool prematurely in the mold and not produce a smoothly formed part.

Also, it has been observed that, particularly in the case of the discharge nozzle but conceivably also in the case of the outlet for the preplasticizing unit, plastic material may gather in these passageways between operating cycles. As the cycles repeat and successive layers of material deposit on the walls surrounding the constricted passageways, said passageways become progressively smaller and the machine will eventually either become plugged and require disassembly to clean or a particle of the deposited plastic may break loose, become entrained in the quantity of plastic being molded and thus make an unsightly, and usually defective, molding.

Further, since the coefficient of plastic-to-plastic friction is greater than the coefficient of plastic-to-clean-metal friction, particularly since the plastic material on the surface of the machine will often have a rough surface, the presence of plastic material on the walls of the machine will tend to cause zones of localized overheating.

Thus, it becomes desirable to provide a process for molding by which a quantity of plastic material, and all of it, will move smoothly and evenly from the preplasticizing zone to the mold cavity, said process containing positive operative steps which will prevent the occurrence of the above described undesirable contingencies, and after rigidifying of the material within the mold cavity, the entirety of said quantity may be removed from the molding machine as a single piece.

Accordingly, a principal object of the invention has been to provide a method of injection molding unplasticized, or substantially unplasticized, polyvinyl chloride.

Another object of the invention has been to provide a process of molding a variety of both natural and synthetic organic plastic materials having a narrow working temperature range and a high viscosity, involving the plasticizing of a quantity of such plastic material to its molding viscosity and thence conducting the entire quantity under a high pressure to a point as close as possible to the mold cavity without materially changing said viscosity.

Another object is to provide a process of molding both natural and synthetic organic plastic materials involving the plasticizing of a quantity of plastic material to its molding viscosity and thence conducting the entire quantity under a high pressure into the mold cavity without materially changing said viscosity.

A further object of the invention has been to provide a process, as aforesaid, having operating steps such that each cycle will be unaffected by other cycles and particularly in which no molding cycle is permitted to be adversely affected by the deposit of material from a previous cycle in a portion of the molding machine.

A further object of the invention has been to provide a process, as aforesaid, in which an extremely exacting control is maintained over the viscosity of the plastic material throughout the entire preparatory and injection steps of the molding cycle.

A further object of the invention has been to provide a method, as aforesaid, which enables the plastic materials to be conducted into a mold under a very high pressure but without excessive frictional heating resulting from such pressure.

A further object of the invention has been to provide a molding process, as foresaid, which is particularly applicable to plastic materials which have a high viscosity at all temperatures but only a narrow range between their molding temperatures and the temperature at which such materials become unfit for molding, particularly by scorching, the initiation of autogenic decomposition, or by curing in the case of thermosetting materials.

A further object of the invention is to provide a machine capable of carrying out the above described process.

Other objects and purposes of the invention will become apparent to persons acquainted with processes and apparatus of this general type upon reading of the following specification as illustrated by the accompanying drawings.

In the drawings:

Figure 3 is a modification of a fragment of Figure 1.

Figure 4 is another fragmentary modification of Figure 1.

Figure 5 is a further fragmentary modification of Figure 1.

Figure 1:
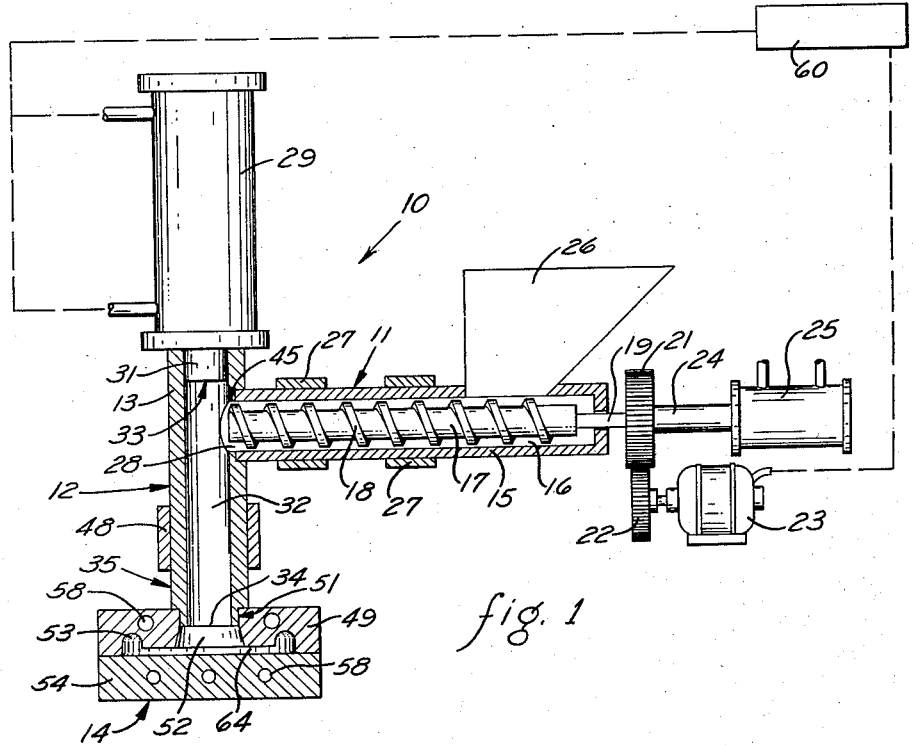
Figure 1 is a side elevation view, substantially in central cross-section, of an apparatus for practicing my process.

Figures 6, 7 and 8 disclose variations in the passageway from the ram chamber to the mold cavity.

Figure 9 is a sectional view as taken along the line IX—IX of Figure 3.

Figure 10 is a modification of Figure 9.

In general

In general my improved method comprises (1) simultaneously heating and agitating the plastic material to bring it to a desirable and uniform molding temperature and viscosity, and (2) without materially altering said temperature or viscosity, moving said plastic material under a high pressure into a mold cavity. In order to prevent a given molding cycle from leaving traces of plastic material in the molding machine and thereby adversely affecting a subsequent cycle, particularly in the case of materials whose molding temperature is very close to the temperature at which it becomes unfit for molding, the process includes handling the material after it leaves the preplasticizing chamber in separate charges and moving the entirety of each of such charges entirely through the rest of the machine and into the mold in each cycle.

The invention is intended for primary applicability to substantially unplasticized polyvinyl chloride, frequently referred to in the trade as "hard PVG," or "rigid PVG," and illustrated by such materials as "Exon" 402A and 401, manufactured and sold by Firestone Tire and Rubber Company, Akron, Ohio, or by "Geon" No. 8700, manufactured by Goodrich Chemical Company, Akron, Ohio. Nevertheless, it is conceivable that the process to which this invention relates is applicable in its broader aspects to any resin having a high minimum viscosity and a narrow working temperature range, such as other polymerizable vinyl halides. Further, although thermoplastic resins are hereinafter referred to for illustrative purposes, it will be recognized that the process may also apply to some thermosetting plastic resins. Accordingly, one of the final steps of the process, which constitutes a rigidifying of the charge of resin in the mold is normally accomplished either by cooling the mold in the case of thermoplastic resins or heating the mold in the case of thermosetting resins.

The particular material upon which said process is intended primarily to operate may be illustrated by Firestone Exon 402A which comprises:

(a) Pure, unplasticized, polyvinyl chloride resin;
(b) A stabilizer, as lead oxide, tin or cadmium;
(c) A lubricant, as carnauba wax, and
(d) A coloring pigment, if desired.

Alternatively, the material may comprise each of the foregoing components plus also another plastic material, as butadiene or styrene, which may be added to improve certain physical properties, as impact strength, but which may reduce chemical or heat resistivity. In either case the term "unplasticized" shall be taken to include any case where the plasticizer present, if any, has no measurable effect upon the plastic material and especially upon its resistivity to chemical attack, where not present in sufficient quantity to migrate and alter the condition and appearance of a painted or varnished surface in contact with the material and where it does not otherwise appreciably alter the physical properties of the finally molded part.

Figure 2:
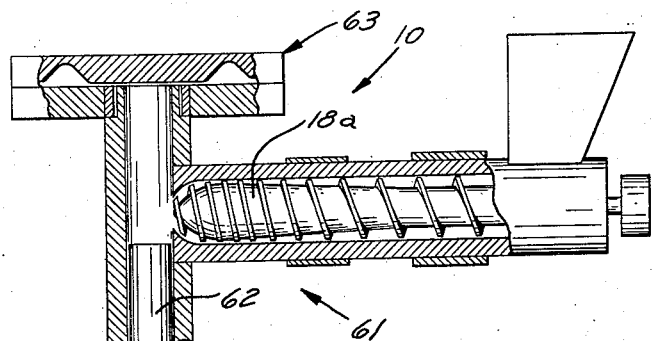
Figure 2 is a side elevation view, partially in central cross-section, of another form of such apparatus.

For convenience in description of certain apparatus whereby my process may be practiced, the terms "upper," "lower" and derivatives thereof will have reference to said aparatus as appearing in Figures 1 or 2. The terms "inner," "outer" and derivatives thereof will have reference to the geometric center of said apparatus or parts thereof. The terms "plasticizing," or "preplasticizing," will be understood as the process of rendering a natural or synthetic organic plastic material to a moldable viscosity. It will not import the adding of a plasticizing material thereto.

At various points in the following description and claims it will be indicated that "all" of the plastic material is moved through the machine and that plastic material from a single charge is "entirely" removed from the machine in a single piece at the time the mold is opened. It will be understood that this absolute terminology is adopted for convenience and that it is recognized that in most, if not all, cases flakes of plastic material, usually very minute, may remain behind the main charge. Further, even where a ram maintains extremely close tolerances with respect to the walls of the injection chamber there still may be a discernible skin of plastic material lying between the ram and the walls of the injection chamber. The presence of such inconsequential amounts of plastic material throughout the machine is recognized as existing at all times. Accordingly, the use of the terminology that 'all" of the plastic material is moved through the machine, and other terminology of similarly absolute import, in either the specification or the claims hereinafter following is to be understood as permitting the leaving of such minute quantities within the machine so long as said quantities are not permitted to accumulate beyond a point at which they still remain sufficiently minute as to have no discernible effect on the finished product.

The term "mold openings" will be understood to mean the mold cavity, the gate runners and sprue collectively

Description of typical apparatus

While the process or method of this invention can be practiced by a variety of different types of machines or apparatus, it will be more readily understood by reference to a particular, illustrative, machine or machines. Therefore, while certain of such machines will be described hereinafter somewhat in detail for illustrative purposes, it will be understood that many other machines can be used for carrying out the steps of said process and that the particular description of several of such machines is not intended to limit in any way their variety.

As shown particularly in Figure 1, one machine adapted to carry out my process is comprised of a preplasticizing unit 11, an injection unit 12 having an injection cylinder 13, and a mold 14. The preplasticizing unit 11 includes a preplasticizing housing 15 containing, in this particular embodiment, a cylindrical elongated preplasticizing chamber 16 in which a screw 17, having a helical flight or flights 18, is snugly but rotatably disposed. Said screw 17 is provided with a coaxial shaft 19 secured to and extending from one end thereof through an appropriate opening in one end of the preplasticizing housing 15 for support of a driven gear 21. Said gear 21 is engageable by a driving gear 22 mounted upon the shaft of a prime mover, such as the motor 23, whereby said screw 17 is rotated as required or desired. As shown in Figure 1, said screw 17 may, if desired, be axially slidable within the preplasticizing chamber 16 for reciprocation by the piston 24 of an actuating cylinder 25. The purpose of such axial reciprocation of the screw 17 will appear hereinafter.

A hopper 26, which communicates with the preplasticizing chamber 16, is mounted upon the preplasticizing housing 15 in a conventional manner. Heating elements 27 are provided around the preplasticizing housing 15, also in a known manner.

The screw 17, although herein disclosed as having a substantially constant diameter in coperation with the straight bore of the preplasticizing chamber 16, may be modified in a number of ways, such as shown in Figures 2 and 4, and still be adaptable to carrying out the process of my invention. Likewise, the helical flights 18 about said screw 17 may be varied in number, pitch and spacing within the scope of this invention. Such variations are well known in the art. The screw 17 is provided for the purpose of heating and preplasticizing the resin by means of agitation, pressure and internal friction in combination with the heating by the heating elements 27 while said resin is being advanced by said screw from one end of the preplasticizing chamber to the other end thereof. Thus, it will be recognized that many variations may be made in said screw for effecting this end so long as the resin is fully plasticized to a uniform viscosity by the time it reaches the discharge end 28 of the preplasticizing chamber 16.

It is necessary that the rate of advancement, agitation and compression of the resin in the preplasticizing chamber 16 be very carefully controlled as discussed below since such functions of the screw 17 can have a material effect upon the temperature and/or the viscosity, of the resin being plasticized.

Where a tapered structure is used at the discharge end 28 of the preplasticizing chamber 16, as shown in Figure 4, appropriate allowance must be made in the spacing of the helical flights 18 to prevent any additional pressure or excessive agitation which will materially vary the temperature and viscosity of the resin beyond the narrow workable range. Thus, the shaping of the discharge end 28 and the screw end cooperating therewith is not intended to assist in plasticizing in the manner of a torpedo but rather acts to prevent the building up of any deposits of preplasticized resin in this area during successive cycles of operations of the machine 10, as more fully set forth hereinafter.

The injection cylinder 13 is connected at its upper end (Figure 1) to an actuating cylinder 29 having a single ram 31 extending into the cylindrical injection chamber 32 within said injection cylinder 13. The ram 31 is preferably constructed in this embodiment to present a single, unbroken surface on the lower face 33 thereof, which face defines a single horizontal plane. In such case the injection chamber 32 may be a straight bore from the upper end thereof, adjacent to the actuating cylinder 29, down through the aperture 34 at the discharge end 35 thereof. Thus, said ram 31 can pass beyond the lower or discharge end 35 of the injection chamber 32 through the aperture 34. The ram is preferably heated in any conventional manner, as by a heat exchange fluid being introduced into its interior.

As shown in Figures 1 and 9, the ram chamber 32 has a circular cross-section throughout its length. However, as shown in Figure 10, said ram chamber may have a square or other cross-sectional contour as desired or required and such is contemplated in this invention without altering the process.

The discharge end 35 of the ram chamber 32 may also be somewhat constricted, as shown at 39 in Figure 4 and at 41 in Figure 5 where small mold charges are involved. Said discharge end 39 (Figure 4) has a spherical end wall 36 and the aperture 37 therein is of less cross-sectional area than the ram chamber 32, intermediate the upper and lower ends thereof. In such case, the lower end 38 of the ram 31 (Figure 4) is spherical on a radius substantially identical with the radius of the spherical end wall 36. Thus, when the spherical ram end 38 is seated against the ram chamber end wall 36, the lower tip of the ram end 38 will extend slightly through the aperture 37 beyond the ram chamber 32.

As shown in Figure 5, the ram chamber 32 may have a conically shaped lower end 42 with a central aperture 43 of less diameter or area than that of the ram chamber 32. In such case, the lower end 44 of the ram 31 is also conical and corresponds substantialy identically with the shape of the end wall 42. Thus, when said ram lower end 44 is seated against the injection chamber end wall 42, the tip of the ram lower end 44 extends through the aperture 43 beyond said injection chamber 32.

Accordingly, in the three alternate forms of the ram and ram chamber, shown in Figures 1, 4 and 5, said ram 31 can in each case extend at least to, and preferably beyond, the lower end of the injection chamber 32 in which it is axially slidably disposed. This is very important to the process of this invention. It is emphasized that the discharge ends of the ram chambers shown in Figures 4 and 5 are not constricted for the purpose of plasticizing or materially changing the temperature or viscosity of the resin as it passes therethrough. Said temperature must remain substantially within said narrow working range of the resin being handled until it reaches the mold. Said constrictions are for convenience only in working with small molds and small charges and are used only where the mold charge is sufficiently small that their use will not raise the temperature of plastic passing therethrough.

An inlet opening 45 (Figure 1) is provided in the sidewall of the ram cylinder 13 for reception of, and/or communication with, the discharge end of the preplasticizing unit 11. The lengthwise axis of the preplasticizing chamber 16 is preferably perpendicular to and intersects the lengthwise or vertical axis of the ram chamber 32 (Figure 1). This applies also to the alternate forms shown in Figures 3, 4 and 5.

Where a cylindrical ram chamber 32 is used, as shown in Figure 9, the adjacent end of the screw 17 is preferably tangent to the internal wall of said chamber, and the helical flight 18 extends only to the plane of tangency, thereby avoiding any interference with the movement of the ram 31.

In the case where a cylindrical ram chamber is provided, it is possible for some collection of deposits of the preplasticized resin to appear at the discharge end of the preplasticizing chamber in the corners 46 (Figure 9) created by the fact that the chamber is cylindrical and the adjacent end of the screw 17 cannot exactly conform therewith. To avoid such collection, the screw 17 may be reciprocated axially by the cylinder 25 following each actuation of the ram 31. Where the injection cylinder is shaped to provide a flat surface 47 (Figure 10), through which the inlet opening 45 is provided, then any need for such axial reciprocation of the screw 17 is eliminated since the adjacent end of the screw 17 may be planar and flush with said flat surface 47. Likewise, the helical flight 18 may extend up to but not beyond the plane defined by said flat surface.

Heating elements 48 are provided around the injection cylinder 31 in a conventional manner for assisting in the heating of said resin and maintaining the temperature thereof within said narrow working range.

The lower or discharge end 35 of the injection cylinder 13 is connected to a mold 14, to the upper half 49 thereof, as shown in Figures 1 and 3 through 8, inclusive.

In Figure 1, the discharge aperture 34 communicates with the sprue opening 52 in the mold upper half 49 and is a continuation of the injection chamber. Alternatively, the aperture may diverge as indicated at 37 (Figure 4) or 43 (Figure 5). Likewise, the sprue opening 52 may diverge downwardly or be a straight bore. Such divergence is provided for aiding in extracting the molding and attached sprue from the mold openings. The sprue opening 52 is connected to the mold cavity by runners 64.

Where a straight bore ram chamber 32 is used, as shown in Figures 1 and 3, the ram 31 may preferably go beyond the discharge end 35 of the chamber 32 into the sprue opening 52, depending upon the amount of resin placed in said ram chamber, and still stop short of contact with the opposed face of the lower mold half 54, as shown in Figure 3. However, where ram structures are used as shown, in Figures 4 and 5, some provision must be made to permit complete occupance of the lower end of the ram chamber by the lower end of the ram therein to assure complete discharge of all resin therefrom and subsequent removal of such resin from the mold and sprue opening 52 with the molding. To effect this, an expansion chamber 55 may be provided in the mold lower half 54, preferably opposite the sprue opening 52 as shown in Figures 4 and 5. Means, such as an expansion ram 56 is provided in the expansion chamber 55 for resisting movement of the resin into the expansion chamber 55. Resistance to downward movement of the ram 56 is created by means such as the actuating cylinder 57. Such resistance is sufficient to insure complete filling of the mold cavity 53 with resin, but is less than enough to prevent complete downward movement of the ram 31 within the ram chamber 32.

Conduits 58 may be provided in the upper and lower mold halves (Figure 1) in a conventional manner for conducting heat exchange fluid or for housing heating elements, as the conditions may require for effecting the rigidification of the resin in the mold 14 in the usual manner.

Conventional control means 60 is indicated in Figure 1 for coordinating the action of the screw and the ram. The other forms of the machine are similarly controlled.

Figure 2 discloses an alternate form 61 of machine whereby my process may be carried out. It differs from the machines above described primarily in that the ram 62 is below the mold 63 and must, therefore, urge the charge of resin upwardly into said mold. In all other respects, said machine 61 may be substantially identical with any of the machines described above.

*Operation of process*

The process of the invention is illustrated by, but is not confined to, the operation of the machines disclosed above.

The resin is introduced into the preplasticizing chamber 16 through the hopper 26, in any convenient quantity. The preplasticizing housing 15, hence its chamber 16, is initially heated by the external heating elements 27. As explained in detail in my application Serial No. 236,803, now abandoned, the mechanical working of the resin by the agitating means, here the screw 17, will raise the temperature thereof to a point within said narrow working range while simultaneously reducing the viscosity of said resin to the proper condition for molding.

Inasmuch as the physical characteristics of the plastic are not entirely uniform from one portion thereof to another, even within a single charge, the relationship between temperature and viscosity will not be exactly uniform. Since the moldability of the plastic material depends upon its viscosity, it is essential that the viscosity be substantially uniform throughout regardless of whether the temperature is correspondingly uniform. Thus, it is emphasized that the process of the invention includes converting the material to a condition of substantially uniform viscosity, which is not necessarily a condition of correspondingly uniform temperature from one particle to the next, and the apparatus indicated is effective for this purpose.

By the time the resin reaches the discharge end 28 of the preplasticizing chamber 16, said resin is fully plasticized to a uniform viscosity and is ready for molding. The motor 23 is controlled through means 60 to correlate its operation with that of the ram 31 so that the screw 17 rotates only when said ram is in its retracted position, as shown in Figure 1.

A predetermined quantity of resin, which quantity is substantially that required to fill the mold, the runners and the sprue opening, is advanced by the screw 17 positively and directly from the preplasticizing chamber 16 into the ram chamber 32 with each operating cycle of the machine. The provision of screw threads to the extreme end of the screw insures that all of the plastic material moves under a positive impelling and none will be permitted to accumulate on the walls of the preplasticizing chamber.

A heating element 48 will maintain the charge of resin in the injection chamber 32 at the temperature to maintain the desired uniform viscosity until said resin is ejected therefrom. The temperature of the ram 31 is maintained at such a level as not to materially alter the viscosity of the resin. This will permit small quantities of material to work in between the ram and the walls of the ram chamber in a softened condition. Such material acts as a lubricant and thereby prevents the sticking of the ram, which occurs if it is cold, and it further acts as a seal between the ram and the injection chamber walls. The ram is actuated downwardly by the actuating cylinder 29 thereby driving the charge of resin from said injection chamber 32 into said mold cavity 53. The mold is cooled or heated, depending upon the type of resin being molded, thereby hardening the resin. The mold halves are then separated and the molded piece is removed from said mold, with the portion of the charge in the sprue opening 52 being integral with the molded piece and removed therewith from the mold. The small amount of resin which has been forced up along the lower sides of the ram 31 during compression will also come free with the molded piece. The ram 31 having been retracted to the position shown in Figure 1, prior to opening of the mold, the machine will again be in condition for another cycle of operation as soon as the mold halves are closed. Such cycles of operation may be continued as long as desired or required with the same results, namely that all of the charge discharged from the preplasticizing chamber 16 in a given cycle of operation will be removed with the molded piece from the mold 14 at the end of that same cycle of operation.

In the forms of the device shown in Figures 4 and 5, the plunger 56 is movable downwardly against a suitably resilient pressure in response to pressure from the ram 31. Thus space is provided to receive any excess quantity of the material being injected during any given cycle and the ram is thereby permitted, regardless of variations in the amounts of material delivered by the screw 17 in a given cycle, to move a full stroke and contact the lower end of the injection chamber, the surface 36 in Figure 4 and the surface 42 in Figure 5. This insures that all material delivered by the screw 17 in a given cycle is moved out of the injection cylinder and is removable with the molded part as a single piece.

In view of the extremely high viscosity of the materials here concerned, particularly unplasticized polyvinyl chloride, very high injection pressures are required and it is necessary that such high pressure exist all of the way into the mold to effect a firm welding of the material therein. Where breaker plates, torpedoes or elongated nozzles are used, the loss of pressure occasioned thereby is so great that far greater pressure than the conventional machines can provide would need to be imposed on the ram. Further, even if such pressures were provided, the frictional heat generated within the material as it passes through such constrictions would carry its temperature far beyond the tolerable range and decomposition, or "burning," would occur. However, by moving the material through substantially unobstructed passageways, this pressure drop is avoided, the necessary high pressure is maintained throughout and yet it avoids the overheating which would otherwise result from driving the material under high pressure through small constrictions. Normally, pressures in excess of 20,000 p.s.i. will be used on the ram and one successful operation by which unplasticized polyvinyl chloride was injection molded, the pressure was 37,000 p.s.i. on the ram.

The somewhat constricted apertures disclosed in Figures 4 and 5 do not materially increase this pressure over that required by the non-constricted aperture disclosed in Figure 1 where the quantities of plastic material to be passed therethrough are small. It has been found that by not using a nozzle at the discharge end of the ram chamber, a material and substantial decrease in the amount of strain and defects in the ultimate product is obtained.

Substantially the entire charge of resin is forced into the mold body by virtue of the fact that the lower end of the ram extends into the mold as shown in Figure 3. Thus, the ram will clean substantially all the plastic material from within the ram chamber and none will be left on the walls adjacent the aperture thereof to foul subsequent charges of resin in subsequent cycles of operation, or to break off with said subsequent charges of resin and disfigure or otherwise render defective the resulting molded piece. Even where the ram does not absolutely clean the walls of the injection chamber, the residue cannot accumulate. The quantity of such residue will never rise beyond the amount left by a single stroke of the ram and this amount is inconsequential.

As mentioned above, where a cylindrical ram chamber 32 is used the screw 17 may be axially reciprocated by the piston 24 of the hydraulic cylinder 25 immediately after each upward movement of the ram 31, thereby positively removing any deposit of resin from the corners 46 of the inlet opening 45 adjacent to the discharge end 28 of the chamber 16, although successful molding operations have been carried out in a cylindrical injection chamber without such reciprocating of the screw.

In the molding of rigid polyvinyl chloride as above defined, it has been found that the working temperature range is in the order of between 15 and 30 degrees F., the decomposition temperature being a little over approximately 390 degrees F., and the softening temperature being about 360 degrees F. The optimum molding range appears to be between 380 degrees F. and 390 degrees F. Thus, it becomes apparent that the removing of all of the charge from the flow path of the charge through the molding machine during one cycle of operation is absolutely essential to this process. By moving all of any given charge of plastic material from the preplasticizing chamber 16 all of the way to the mold cavity and not permitting any of said charge to be left in the equipment at any point in between said chamber 16 and said cavity, the machine is kept clean at all times and there is no possibility of the resin accumulating on the walls of the ram chamber to form a deposit thereon and to constrict, and eventually to stop, the flow of resin in subsequent charges.

While the foregoing description is in terms of a single mold charge being conveyed from the hopper to the mold in a cycle of operation, it may in some instances be practicable to have two or more mold charges in the injection portion of the machine at any given time, providing only that the ram 31 moves all the way through its stroke to the lower end of the ram chamber and through the aperture 34 thereof at sufficiently short intervals that all of the resin within the ram chamber will be thoroughly and completely eliminated therefrom and no fragments of congealed material will be permitted to collect therein for a period of time sufficient to render them unfit for molding.

While the foregoing described operation is entirely satisfactory and will produce molded parts from substantially unplasticized polyvinyl chloride which parts are acceptable for a wide variety of purposes, still better results can be obtained by introducing a further step in the preplasticizing operation. As above described, the preplasticizing operation consists merely of simultaneous mixing and agitating and a combination of external and internal heating by which the material is brought to a molding viscosity. If, however, the cross-sectional area through which the plastic material passes after it has been partially softened is diminished sufficiently that the plastic material will squirt therethrough at a speed higher than the circumferential speed of the screw, much better characteristics will be obtained in the finished product. Particularly, a much higher tensile strength will be obtained which manifests itself as a much higher burst strength in the making of pipe fittings, less weld lines are encountered and much better structure within the material itself is obtained. As a specific example, this additional step has resulted in increasing the burst strength of two inch pipe elbow made from substantially unplasticized polyvinyl chloride (Exon 402a) from 800 p.s.i. to 1,500 p.s.i. This further compounding may be effectively, though not exclusively, accomplished by utilizing a screw, such as the screw shown at 18a in Figure 2, wherein the difference between the root diameter of the screw and the diameter of the preplasticing chamber is materially diminished for a portion of the axial length of the screw and is then again increased. Here such diminishing and at least part of such increasing is effected by changing the root diameter of the screw while maintaining the diameter of the preplasticizing chamber constant, as fully set forth in my co-pending application Serial No. 241,577, now abandoned, in connection with the handling of plastic materials of other kinds.

While in the foregoing it has been assumed that the screw extends all of the way to the injection chamber, and that the screw thread extends all of the way to the end of the screw, and such is the preferred construction, it should be understood that the absolute nature of these statements should not be permitted to become misleading. It is possible in some instances to terminate the screw a little short of the actual end of the preplasticizing chamber and it is possible to terminate the threads of the screw slightly short of the end of the screw providing only that the distances by which the thread fails to reach the actual end of the screw or by which the screw fails actually to meet the injection cylinder is not so great that material will accumulate on the walls of the preplasticizing chamber or at the end of the screw. Thus, the references in the foregoing description and in the following claims to the extent of the screw with respect to the preplasticizing chamber and to the extent of the screw threads with respect to the root thereof should be interpreted with this tolerance in mind.

Although I have described and disclosed particular preferred embodiments of apparatus by which my process may be practiced, it will be understood as stated hereinabove, that variations thereof may be made within the scope of such disclosure without departing from such scope and these variations are fully contemplated herein unless specifically stated to the contrary in the appended claims.

I claim:

1. In a process for injection molding of substantially unplasticized polyvinyl chloride material, including intermittent delivery of successive charges of said material at a selected moldable viscosity from an intermittently operating injection cylinder having a port in a side wall thereof for delivery of material into the cylinder and having a ram reciprocable in the cylinder for forcing material therefrom under high pressure into a mold periodically associated with a discharge opening in one end of the cylinder, the steps of periodically advancing a quantity of said material in an elongated plasticizing zone communicating with said cylinder through said delivery port, subjecting advancing material in said zone to mechanical agitation and working by a rolling and churning motion throughout the mass of said quantity and simultaneously progressively heating the material as it advances in said zone to reduce the viscosity thereof, mechanically impelling a charge of the thus heated material from said zone directly through said delivery port into said injection cylinder, controlling said agitating, working and heating so as to cause said material to attain just prior to its delivery into said cylinder a fully plasticized condition wherein the temperature of the material is within the critical and narrow range at which it is workable and the material is in a plastic state of uniform selected moldable viscosity, said advancing, agitating, working and delivery operations occurring only during that portion of each cycle of operation of said cylinder when said ram is in a retracted position, and only a single such charge in an amount measured to fill a single mold being delivered to said cylinder during each said cycle, effecting during said delivery operation mechanical removal of residual plasticized material which tends to accumulate in the vicinity of said delivery port, operating said ram to discharge from said cylinder into an associated mold during each said cycle substantially the entirety of the charge delivered to the cylinder during the cycle, maintaining the temperature and the uniform selected viscosity of the material of each charge substantially unaltered throughout the delivery of the charge from said plasticizing zone into said cylinder and also throughout the residence of the charge in the cylinder and the discharge of the charge from the cylinder into the associated mold, effecting solidification of the charge and then opening the mold and removing the whole of the charge as an integral unit in a solidified form.

2. In a process for injecting into a mold substantially unplasticized polyvinyl chloride material, the steps comprising: moving in a first zone a quantity of said material along a confined path toward a second zone and during such moving subjecting a single mold charge of said quantity to simultaneous heating, agitating same and compression for progressively raising the temperature and lowering the viscosity of said charge as it passes along said path; continuing said moving, heating, agitating and compressing until at least a final portion of said charge within said path at a point near its discharge end is at a viscosity suitable for molding, said heating, agitating and compressing being controlled to effect a substantially uniform viscosity throughout said charge of said material when said viscosity of said charge within said path is at a value suitable for molding; protecting said charge from any appreciable change in viscosity and delivering it through a continuation of said path from said first zone into said second zone, said charge being less than said quantity and at least as great as the volumetric capacity of said mold, said delivering including passing an impelling mechanical element adjacent and along that part of the walls defining said first zone which contacts said material after it has reached a plasticized condition for positively moving all of said charge from said part of said first zone and continuing such passing of said mechanical element to a point substantially adjacent the entrance to said second zone in order to prevent the accumulation of material along or on the walls defining said first zone; and terminating said agitation as said material enters said second zone; further protecting said charge against any appreciable change in viscosity and subjecting same to pressure; continuing to protect said charge against any appreciable change in viscosity while utilizing said pressure to propel said charge out of said second zone and toward said mold, said pressure being applied positively to the entirety of said charge to move substantially all of it into said mold, the entirety of said charge being removable from the molding equipment upon rigidification thereof in order to prevent the accumulation of any residual portions of said charge in said second zone; rigidifying said measured portion in said mold and removing the entirety thereof from the molding equipment.

3. In a process for molding substantially unplasticized polyvinyl chloride resin, the steps comprising: advancing and progressively mechanically working same said resin to heat a quantity thereof in a first zone to a temperature within a working range of between 360° F. and 390° F. and to convert said resin to a condition of uniform and moldable viscosity; passing an impelling mechanical element through and along the walls of that part of said first zone contacted by said resin after it reaches said working temperature for positively impelling all of said quantity out of said first zone and directly into a second zone and controlling said impelling to effect same without raising the temperature of any of said resin above said working range; maintaining the temperature of said quantity of resin in said second zone at such a value as not to change materially the viscosity of any portion thereof; and positively impelling substantially all of said quantity out of said second zone and into a mold under a pressure in excess of 20,000 p.s.i. and without raising the temperature of any part thereof to a value over about 390° F.; imposing such a temperature on the mold as to effect rigidification of said quantity; and removing the entirety of said quantity from said mold as a single piece.

References Cited in the file of this patent
UNITED STATES PATENTS

| | | |
|---|---|---|
| 2,207,426 | Bailey | July 9, 1940 |
| 2,252,107 | Weida | Aug. 12, 1941 |
| 2,309,729 | Gordon | Feb. 2, 1943 |
| 2,338,607 | Wacker | Jan. 4, 1944 |
| 2,359,840 | Goessling | Oct. 10, 1944 |
| 2,413,401 | Youngblood et al. | Dec. 31, 1946 |
| 2,469,342 | Richardson | May 3, 1949 |
| 2,477,258 | MacMillin | July 26, 1949 |
| 2,505,540 | Goldhard | Apr. 25, 1950 |
| 2,537,182 | Betrand | Jan. 9, 1952 |
| 2,686,935 | Stott | Aug. 24, 1954 |

UNITED STATES PATENT OFFICE

CERTIFICATE OF CORRECTION

Patent No. 2,890,491                                                       June 16, 1959

James W. Hendry

It is hereby certified that error appears in the printed specification of the above numbered patent requiring correction and that the said Letters Patent should read as corrected below.

Column 12, line 13, after "working" strike out "same".

Signed and sealed this 26th day of January 1960.

(SAME)

Attest:

KARL H. AXLINE                                              ROBERT C. WATSON

Attesting Officer                                         Commissioner of Patents